US008538225B2

(12) United States Patent
Caplan et al.

(10) Patent No.: US 8,538,225 B2
(45) Date of Patent: Sep. 17, 2013

(54) COMMUNICATIONS DUCTING SYSTEM AND METHOD OF LAYING SAME

(76) Inventors: Peter Caplan, Southampton (GB); Robert Bicket, Southampton (GB)

( * ) Notice: Subject to any disclaimer, the term of this patent is extended or adjusted under 35 U.S.C. 154(b) by 0 days.

(21) Appl. No.: 11/813,856

(22) PCT Filed: Nov. 2, 2005

(86) PCT No.: PCT/GB2005/050191
§ 371 (c)(1),
(2), (4) Date: Jul. 12, 2007

(87) PCT Pub. No.: WO2006/048686
PCT Pub. Date: May 11, 2006

(65) Prior Publication Data
US 2008/0298755 A1 Dec. 4, 2008

(30) Foreign Application Priority Data
Nov. 3, 2004 (GB) .................................. 0424345.7

(51) Int. Cl.
*G02B 6/00* (2006.01)
*B63B 35/03* (2006.01)
*B63B 35/04* (2006.01)
*F16L 1/00* (2006.01)

(52) U.S. Cl.
USPC .......................... 385/135; 385/147; 405/154.1

(58) Field of Classification Search
USPC .............. 385/135; 405/154.1, 156, 157, 159, 405/174, 178, 179, 180, 183, 5, 184.1
See application file for complete search history.

(56) References Cited

U.S. PATENT DOCUMENTS

| 3,347,521 | A | * | 10/1967 | Bingham | 254/29 R |
|---|---|---|---|---|---|
| 4,815,891 | A | * | 3/1989 | O'Connor | 404/77 |
| 5,556,225 | A | * | 9/1996 | Marino | 404/77 |
| 5,694,709 | A | * | 12/1997 | Cronk et al. | 37/142.5 |
| 5,765,967 | A | * | 6/1998 | Klaymar | 405/179 |
| 5,921,707 | A | * | 7/1999 | Owen | 404/75 |
| 6,055,749 | A | * | 5/2000 | Cronk, Jr. | 37/142.5 |
| 6,065,902 | A | * | 5/2000 | Mayr et al. | 405/174 |
| 6,371,691 | B1 | | 4/2002 | Finzel | |
| 2002/0061231 | A1 | * | 5/2002 | Finzel et al. | 405/154.1 |
| 2003/0123935 | A1 | * | 7/2003 | Dofher | 405/183.5 |
| 2004/0165957 | A1 | | 8/2004 | Serrano et al. | |
| 2005/0191133 | A1 | * | 9/2005 | Purcell | 405/157 |

FOREIGN PATENT DOCUMENTS

| FR | 2580437 | * | 10/1986 |
|---|---|---|---|
| FR | 2750717 A1 | | 5/1996 |

* cited by examiner

*Primary Examiner* — Ryan Lepisto
*Assistant Examiner* — Robert Tavlykaev
(74) *Attorney, Agent, or Firm* — Gablegotwals

(57) ABSTRACT

A communications ducting system, and method of laying a communications duct assembly below a surface, usually in a carriageway or footpath, using an open slot which is subsequently backfilled. The width of the slot is preferably not substantially greater than the narrowest outer cross sectional width of the duct assembly. In at least one direction, the duct assembly has a dimension of less than 20 mm and thus the slot need be no more than 20 mm wide. The duct assembly can be laid along the bottom of the slot, preferably on a layer of sand or other bedding material. Access chambers may provide fiber blowing points along the slot for installing optical fiber in the duct assembly after the assembly is in place, either for the original installation of the fibers or for repair purposes. The access chambers can also be used to accommodate changes in direction of the slot and for repairs in the duct assembly.

28 Claims, 4 Drawing Sheets

COMMUNICATIONS DUCTING SYSTEM AND METHOD OF LAYING SAME

The present invention relates to a communications ducting system and to a method of laying same.

There are various known methods for laying communications cables of different types underground. For example, mechanical diggers or cable-laying ploughs are known which cut an open trench into which a pipe or duct for taking cables is laid and then buried. Cables can later be installed in the duct. However, the trench is relatively wide, usually 300 mm or more, which makes reinstatement difficult and the operation overall is relatively costly, time consuming and can cause significant disruption. Afterwards, the reinstated trench is clearly visible and in many situations can look unsightly and can wear at a different rate to the original surface, which itself can cause significant problems. It is not generally possible to reinstate the surface to look as it did before the trench was cut.

U.S. Pat. No. 6,371,691 discloses a method of laying optical communications cable into a narrow and shallow laying channel or slot when working in sand, gravel, earth or asphalt.

U.S. Pat. No. 6,371,691 discloses a multipurpose laying unit which carries out the following series of steps:
 cutting a laying channel
 feeding a microcable or duct into the channel using a laying blade that also holds the sidewalls from caving in
 holding the microcable or duct at a constant depth in the channel compacting filling material into the channel, immediately behind the laying blade.

The relative sizes of the laying channel and the microcable or duct are described as important as the narrowness of the channel is said to reduce the risk of buckling of the microcable or duct. Indeed, a laying unit is described in which the cutting width for cutting the laying channel can be set to the respective diameter of the microcable used. As claimed, the laying channel is said to have a width "adapted to the diameter of the microcable". Also as claimed, the range of channel widths is 4.5 mm to 12.0 mm while the range of diameters of microcable is 2.0 mm to 10.0 mm.

The depth of the laying channel is described in U.S. Pat. No. 6,371,691 as being from 4 cm (40 mm) to 15 cm (150 mm) with an optimum depth of 7 cm (70 mm).

The optical communications cable laid according to the disclosure of U.S. Pat. No. 6,371,691 is thus of small diameter and laid close to the surface of the ground. Although convenient to install compared with previous open trench methods, such cable is inevitably vulnerable to damage and a fairly complex repair process and equipment are described, installing spare lengths of fibre for jointing, which enable a bridge to be made across a damaged region of the cable so as to reinstate communications at the damage site. It also requires careful and exacting laying of the cable to maintain a consistent line with no sudden bends. Sophisticated laying apparatus is required and described for this purpose.

According to one embodiment of the present invention, there is provided a method of burying an optical communications duct assembly below a surface, the cross section of the duct assembly having two outer dimensions in orthogonal directions, at least one of said dimensions being no more than 20 mm, which method comprises the steps of:
i) cutting a slot into the surface, the slot having a width in the range from more than 12 mm up to and including 30 mm;
ii) laying the duct assembly in the slot such that it is at least partially supported by the bottom of the slot; and
iii) backfilling the slot.

Preferably the method further comprises the step of reinstating the surface as this can improve aspects such as appearance and wearability.

Reference is made above both to an optical communications cable and to a duct assembly. An optical communications cable is a term used generally to describe a communications line which carries one or more optical fibres, whether or not the one or more fibres is/are carried in a duct. A duct is a tube of substantially rigid cross section. Optical fibres might be present in a duct for instance individually, in a bundle or in a minicable or microcable. A duct is characterised in that optical fibres can be installed in it subsequent to manufacture and indeed often subsequent to installation of the duct, as long as there is spare capacity in the duct. This is enabled by the substantially rigid cross section which provides a space into which the fibre(s) can be installed. A duct assembly comprises at least one duct and may comprise further components such as an outer sheath.

The present invention might apply to communications cable as well as to ducts.

Embodiments of the present invention are relevant both to arrangements in which a duct assembly is installed in a slot "ready to use", having for example optical fibres already in place in one or more ducts of the assembly, and to arrangements in which fibres can be installed retrospectively, for example by blowing. The terms "duct" and "duct assembly" are used herein to encompass both arrangements, unless the context indicates otherwise.

It has been recognised in making the present invention that it is not essential that the width of the slot is adapted to the dimensions of the duct assembly for the purpose of reducing or avoiding buckling of the duct assembly. It is not even essential that the slot has a width greater than the maximum outer dimension of the duct assembly since the duct assembly can have an elongate cross section, having a smaller dimension in one direction than another, and can therefore be inserted into a slot in such a way that its smaller dimension extends across the slot. The slot only has to be as wide as this smaller dimension. This arrangement allows more optical fibres to be carried in the duct assembly since, in use, the fibres can be effectively stacked in the longitudinal (usually upward) direction of the slot cross section. Thus the width of the slot does not limit the capacity of the duct assembly.

Embodiments of the present invention generally require less exacting cutting and laying procedures than prior art techniques, for example that described in U.S. Pat. No. 6,371,691. A duct assembly can be adequately supported at the bottom of the slot, even during a subsequent backfilling process, without the close relationship between slot width and duct assembly dimension. Thus the width of the slot can be selected based on its ease of preparation and use overall in laying a duct assembly and the ease of adequate reinstatement of the surface. Based on these criteria, it can for example be significantly greater than the smaller dimension of the duct assembly, for example be at least 4 or 5 mm greater and potentially even double or more. In preferred embodiments, the width of the slot lies in the range from 13 mm to 20 mm as this is relatively easy to construct and can be reinstated without being unsightly.

Preferably, in a duct assembly having an elongate cross section, neither one of two dimensions in mutually orthogonal directions measures more than 20 mm. This has two advantages. It reduces the risk of interfering with other installations since optical communications cables are often needed in locations where other utilities are also installed, such as near buildings. It also reduces the risk of accidental damage to the duct assembly in use since a duct assembly which itself has a larger dimension inevitably makes a larger "target".

Suitable cross sectional shapes of duct assemblies for use in embodiments of the present invention will be selected based on criteria such as the number and size of ducts to be accommodated. Usually cross sectional shapes considered suitable will be based on a circle or square since this maximises capacity but the shapes will not necessarily show symmetry about one or either of the mutually orthogonal directions and might include but are not limited to the following shape types: oval; rhomboid; triangular (equal or unequal); rectangular; and parallelogram.

Depending on the specific nature of the surface below which the duct assembly is to be buried, the slot may typically have a depth below the surface in the range from 150 mm to 400 mm; possibly less than 350 mm. A depth in one of these ranges has been found to be both adequate and convenient in a range of different environments. This contrasts with the shallower depth of the laying channel described in U.S. Pat. No. 6,371,691. The greater depth of embodiments of the present invention offers greater protection against damage incurred from above, for example in road repairs, without causing significant problems in the laying/burying process.

Preferably the duct assembly is laid in an unbound layer of the surface structure. For example if the surface structure is a roadway then a cut is made through a tarmac or concrete outer layer through to an unbound structure such as loose aggregate into which the duct assembly is laid.

An aspect of the laying unit and microcable or duct disclosed in U.S. Pat. No. 6,371,691 is that as the microcable is laid by the laying unit, the laying unit immediately fills in the slot and compacts the filling material around the microcable with a jetting rod. It is an essential requirement of the microcable as claimed in U.S. Pat. No. 6,371,691 that it comprises a tube which is "pressurized-water-tight". In embodiments of the present invention, the compacting step has been found unnecessary.

In contrast, a duct assembly of the present invention is not required to be pressurized-water-tight and nor is any duct of the duct assembly, although it is preferable that any fibres present in the duct assembly are protected along its length by at least one structure, such as a duct wall or a sheath of the assembly, which is airtight at ambient pressures. Thus, embodiments of the invention can enable non-pressurised water-tight ducting to be used, which can substantially reduce costs and installation times. In a range of performance extending up to pressurised-water-tight, the performance of a duct wall in the duct assembly can therefore be selected to lie at a point on the range below pressurised water-tight. This allows lower performance requirements in the duct assembly in an embodiment of the present invention.

Preferably, the step of laying the duct assembly in the slot such that it is supported by the bottom of the slot comprises laying the duct assembly on or in a layer of supporting material on the bottom of the slot so that it is supported at least partially via this supporting material. This supporting material may comprise for example sand, other granular material, foam or any other suitable substance. The material may be added or may be produced by an earlier step such as cutting and/or washing out the slot. The material may in practice be a slurry or a composition that will set and it may also optionally act as a binder.

A duct assembly for use in embodiments of the present invention preferably comprises at least one duct for the subsequent installation of optical fibres, for example by the known technique of fibre blowing. Although some fibre might be present in the duct assembly at the time of laying, preferably fibre can be installed subsequent to laying. This might be for instance for the purpose of adding communications capacity at a later date or for repairing damage.

A preferred form of duct assembly comprises at least two and preferably three or more ducts, this providing flexibility in routing since each duct can be brought separately out of the duct assembly and routed independently. Ducts which accept subsequent installation of optical fibres are conventionally of circular cross section, particularly where fibre blowing is to be used. In order to install maximum capacity for accepting optical fibres in a relatively narrow slot, it is preferred that the ducts are arranged to give an elongate cross section to the duct assembly. Thus three or more ducts might be arranged linearly, one duct being positioned between at least two other ducts. The ducts do not have to have the same diameter and, in a second preferred arrangement, a larger duct is arranged in a triangular formation with two smaller ducts. A duct assembly having an elongate cross section in this way can be installed in the slot with its larger dimension extending upwards in the slot and thus not being constrained by the narrow width of the slot.

A duct assembly that might be used in an embodiment of the invention comprises two, three or more ducts installed in a composite sleeve, the sleeve comprising a tube of relatively inert plastics material such as polyethylene which is lined with a waterproof barrier. In a particularly convenient construction, a waterproof barrier may be constructed in metal or other suitable material to give a non-resilient memory so that the duct assembly can be deformed to a required shape. This non-resilient memory can be used in laying the duct assembly around corners or at changes in surface level.

A further embodiment of the invention comprises a duct assembly as described above, laid in a slot. Preferably, such a duct assembly is provided with access chambers. These can be used for example to give protected access to fibre blowing points for the installation of fibre. They can also or alternatively be used to provide a protected space in which a duct assembly can be bent through a corner. It is often not feasible to cut a curved slot in order to accommodate a change in direction of the duct assembly. An access chamber can be provided at a corner between two straight slots arranged at angles to one another. A duct assembly installed along one slot can then be bent within the access chamber to meet the direction of the other slot.

Another potential use of access chambers is in a repair process to a duct assembly. If there has been damage to one or more optical fibres within a duct, it becomes a relatively simple matter to pull out the damaged fibre (if necessary for example to create space in the duct) and to blow in a fresh fibre from an existing fibre blowing point. If one or more ducts have themselves been damaged however, the problem is greater since the damaged section(s) of duct needs also to be replaced. Depending on the extent of the damage, it may be possible to expose the damaged section of duct, install an access chamber at the site and to repair the damaged duct within the protection of the access chamber. Fresh fibre can then be blown in across the damaged section from an existing fibre blowing point along the slot. Alternatively, the damaged section of duct might be removed and a new fibre blowing point installed in the access chamber. (It is not always necessary to use an access chamber for making repairs however. It may in some circumstances be feasible to expose a damaged section of duct, repair and rebury it directly, again blowing in fresh fibre as necessary from an existing fibre blowing point along the slot.)

Thus embodiments of the invention have significant advantages, especially in urban environments. They are particularly quick and simple both to deploy and to repair while minimising long term physical and visual impact.

Installation of a duct assembly will now be described as an embodiment of the present invention, by way of example only, with reference to the accompanying figures in which.

It should be noted that the figures are not drawn to scale.

Figure 1:
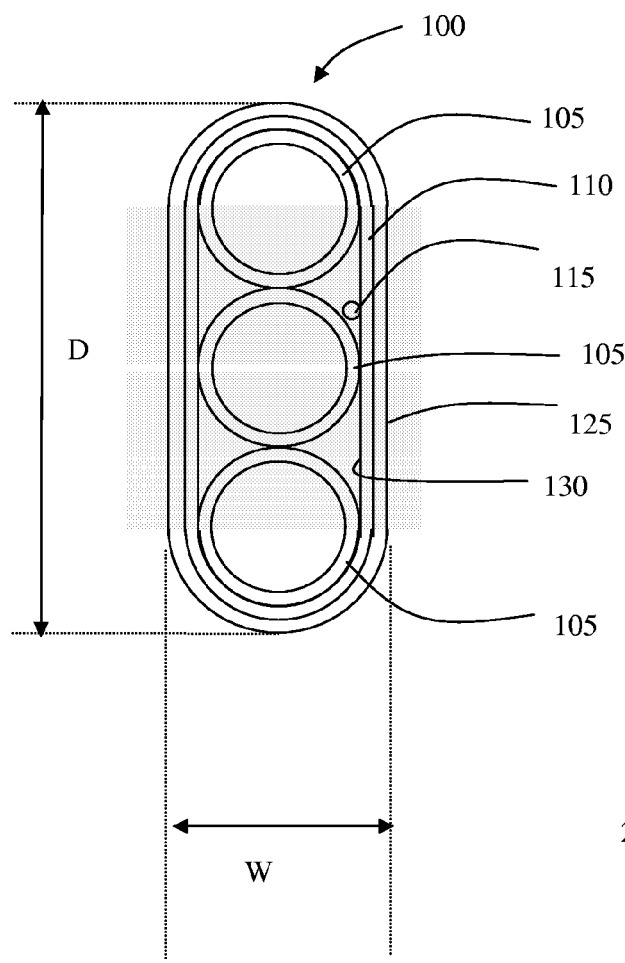
FIG. 1 shows a cross section of a duct assembly of a first type, according to an embodiment of the invention.
Figure 2:
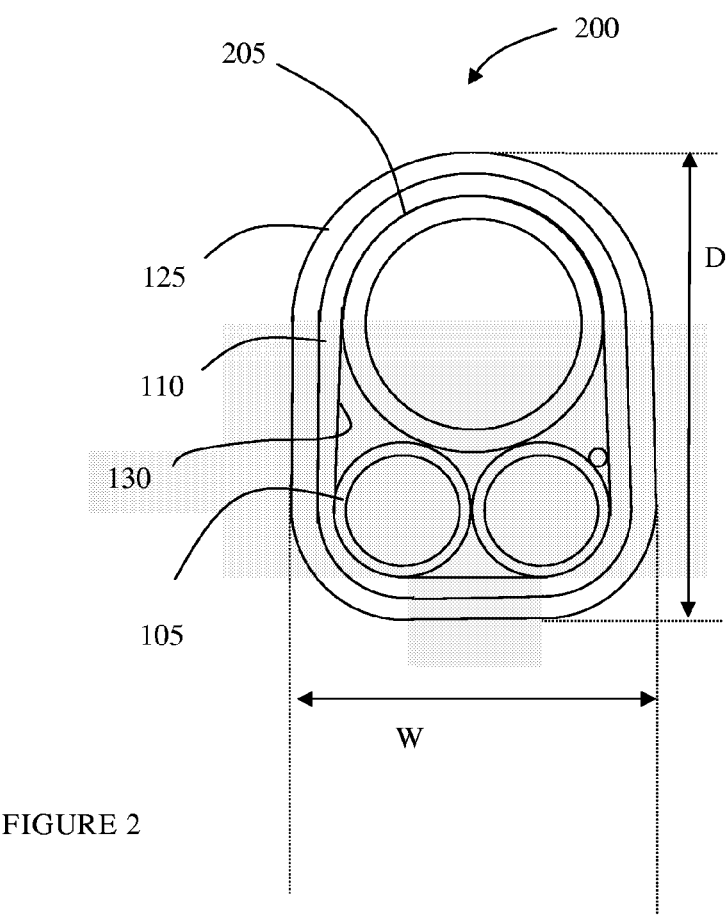
FIG. 2 shows a cross section of a duct assembly of a second type, according to an embodiment of the invention.

Referring to FIGS. 1 and 2, duct assemblies 100, 200 for use in an embodiment of the invention have a maximum dimension "W" in one direction of not more than 20 mm and preferably about 13 mm. Both duct assemblies 100 and 200 have a maximum dimension "D" in the orthogonal direction which may be but is preferably not greater than 20 mm, giving them an elongate cross section. This allows them to be installed in a slot which has a relatively narrow width in the "W" direction while still accommodating a useful number of optical fibres by stacking them in the "D" direction. The duct assemblies 100, 200 also have a rugged construction, suitable for installation into slots cut into carriageways and pavements, while retaining a degree of pliability for following changes in direction and level.

In more detail, each of the duct assemblies 100, 200 comprises three ducts 105, 205 having low friction internal surfaces suitable for fibre blowing. Ducts of this general type are known but the dimensions of the duct assemblies 100, 200, and thus of the ducts 105, 205, are important in embodiments of the invention.

The duct assembly 100 of FIG. 1 has three similar ducts 105 arranged in line. Each of the ducts 105 is made of polyethylene ("PE") and has an inner diameter of 3.5 mm±0.1 mm and an outer diameter of 5 mm±0.1 mm. Each of these has the capacity to accommodate twelve blown optical fibres, thus providing thirty six fibres in the assembly.

The ducts are arranged in a double outer sheath 110, 125 having an aluminium protection barrier 130 on its inner surface. The double outer sheath has:

i) a first sheath 110 of medium density polyethylene (typically 0.926 g/cc) whose thickness is 1.1 mm±0.2 mm including the aluminium waterproof barrier; and ii) a second sheath 125 of high density polyethylene (typically 0.945 g/cc) whose thickness is 1.0 mm±0.2 mm.

The overall dimensions of the duct assembly 100 as shown in FIG. 1 are:

Height "D"=nominally 19.2 mm with a maximum of 19.5 mm; and

Width "W"=nominally 9.2 mm.

The duct assembly 100 has a nominal mass of 124 g/m and a minimum bend radius in the "W" direction of 150 mm.

The maximum pull force recommended for use in installing this duct assembly type is 80 kg. In order to get access to the ducts 105, the second sheath 125 can be cut with sheath cutters and a suitable ripcord 115 is provided to open the first sheath 110.

The duct assembly 200 of FIG. 2 is novel. It substitutes one of the 5 mm ducts 105 with a larger duct 205 and the three ducts are arranged in a triangular formation. The larger duct 205 has the same material construction as the two smaller ones 105 but has an inner diameter of 8 mm±0.1 mm and an outer diameter of 10 mm±0.1 mm.

Differences between the larger duct assembly 200 and the smaller one 100 are as follows:

i) the larger duct 205 can accommodate ninety six blown optical fibres;

ii) the second sheath 125 has a thickness which is nominally 1.2 mm;

iii) height "D"=nominally 19.2 mm with a maximum of 19.8 mm;

iv) width "W"=nominally 15.0 mm;

v) nominal mass of 173 g/m;

vi) the minimum bend radius in the "W" direction is 225 mm; and vii) the maximum pull force recommended is 120 kg.

The minimum bend radius in the "W" direction is mentioned above. Minimum bend radii of the duct assemblies 100, 200 are generally set to ensure there is no permanent deformation of a duct 105, 205 in handling or installation of the duct assembly since this can make installation of fibres in the duct 105, 205 significantly less efficient. The minimum bend radius in the "D" direction will therefore usually be at least as great as that in the "W" direction.

Either of the duct assemblies 100 and 200 may have two or more ripcords to make opening of the sheaths 110, 125 easier.

The second sheath 125 in each of the duct assemblies 100, 200 is brightly coloured, for example bright green, to assist working with it in the field.

The duct assemblies 100, 200 described above are compliant with the requirements of IEC 60794-3-10, a current international standard for outdoor cables giving a family specification for duct and direct buried optical telecommunication cables (produced by the International Electrotechnical Commission in conjunction with the British Standards Institute).

The duct assemblies 100, 200 provide airtight protection to any fibre carried in the or each duct 105, 205. In practice, this is achieved by any one of several of the structures in the duct assemblies 100, 200, and in particular by the sheaths 110, 125, the waterproof barrier 130 and the wall(s) of the duct or ducts 105, 205. Importantly, this allows ducting 105, 205 to be used which is less than pressurised watertight. That is, the performance of the duct walls in a direction transverse to the line of the duct assembly 100, 200 is less than pressurised watertight.

Figure 3:
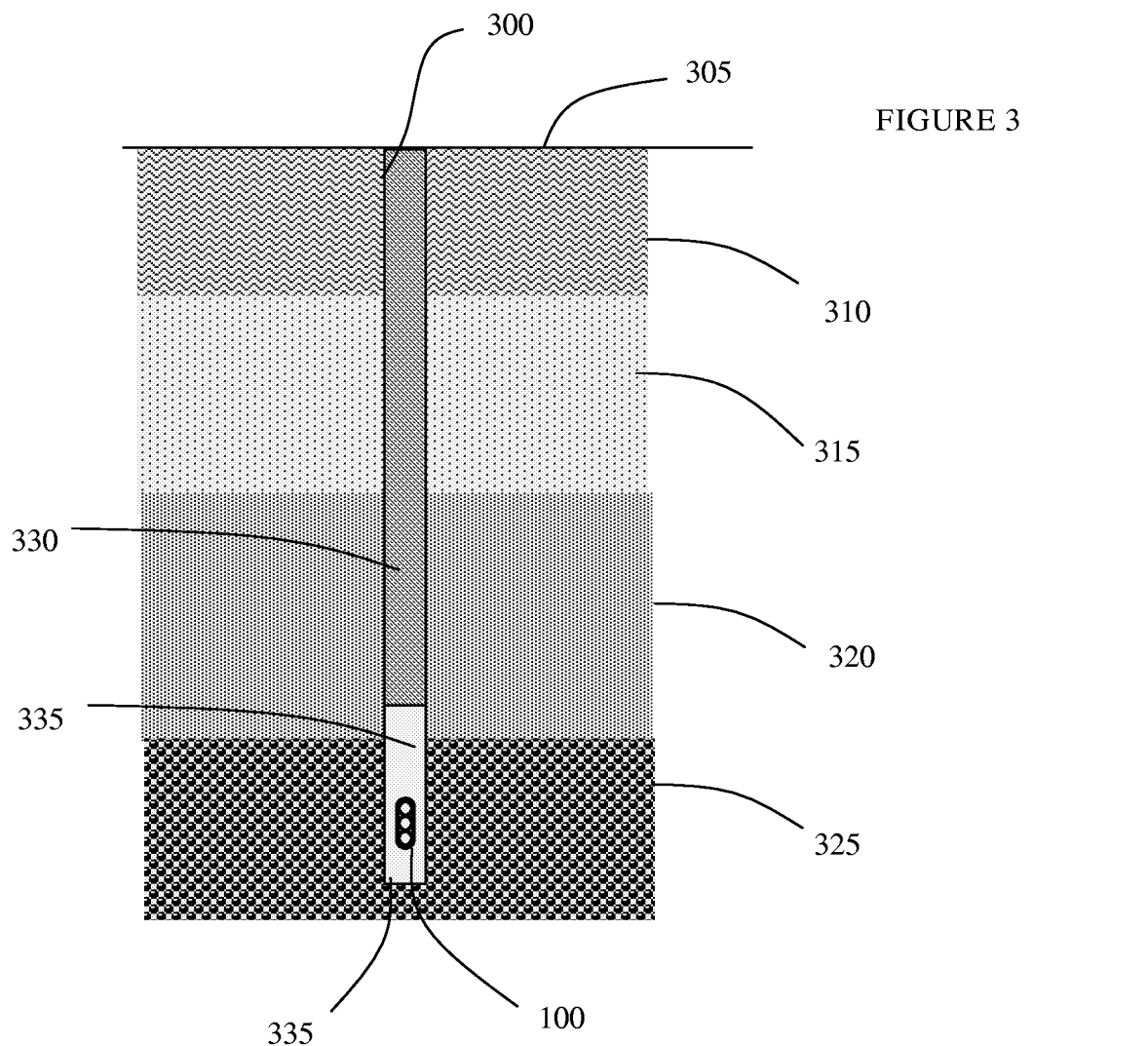
FIG. 3 shows a vertical transverse cross section through a slot cut in a highway, having a duct assembly as shown in FIG. 1 installed.

Referring to FIG. 3, a method of installing a duct assembly 100, 200 in a carriageway or other surface is based on cutting a slot 300 having a width of from more than 12 mm through to 30 mm through the bearing surface 305. Preferably the slot is from 13 mm to 20 mm wide as this is relatively easy to create and accommodates duct assemblies of reasonable capacities while remaining easy to reinstate effectively and relatively unobtrusively. This can be done using a known floor saw although it is likely to be done in more than one pass, each of 50 mm deep. The depth of the slot 300 below the surface 305 will be set according to factors such as the composition and type of infrastructure present below the bearing surface 305. Preferably the slot extends into unbound material below any bound structural surface layer (for example below tarmac or concrete). In the roadway as shown, a base layer 320 is laid onto a sub-base 325. A binder course 315 sits on the base layer 320 and a bound wearing layer 310 tops the roadway and provides the bearing surface 305.

The cut slot 300 is flushed with water to clean it out and a layer of support material 335, for instance a fine granular material such as sand, can optionally be used to provide a bed along the bottom of the slot 300. In practice, the step of washing out the slot can often leave a loose slurry which is perfectly adequate as the support material. Alternatively, a support material can be added. This might be for example sand, foam, a composition that will set or any other suitable substance. The support material may also act as a binder. The duct assembly 100, 200 is lowered into the slot 300 onto or into the support material 335 and further loose material added to backfill to a depth of 10 mm above the duct assembly 100, 200. The duct assembly 100, 200 is then at least partially supported by the support material 335. A slurry mixture such as "Instarmac Flowpoint" with water is then poured into the slot to a depth of 50 mm below the roadway surface 305 and hot bitumen used to bring the finished level in the slot 300 level with the roadway surface 305. (Instarmac Flowpoint is a product of the Instarmac Group PLC.)

It is an option to use a binder layer above or around the duct assembly 100, 200. This might be for example a product known as "Grano dust": a fine, hard aggregate, often, but not exclusively a granite. An amount of sand and/or cement might also be added. Granules in the binder layer protrude into the sides of the slot 300 and lock with the sides and with other granules. Again, in practice, material arising in cutting and/or washing out the slot can provide the binder layer.

It is also an option to use a heat sink material between the duct assembly 100, 200 and any hot materials such as the hot bitumen. Examples of suitable heat sink materials include but are not limited to sand, Grano dust, foams, polymeric and plastics materials, and/or an elasticated foam rod.

Figure 4:
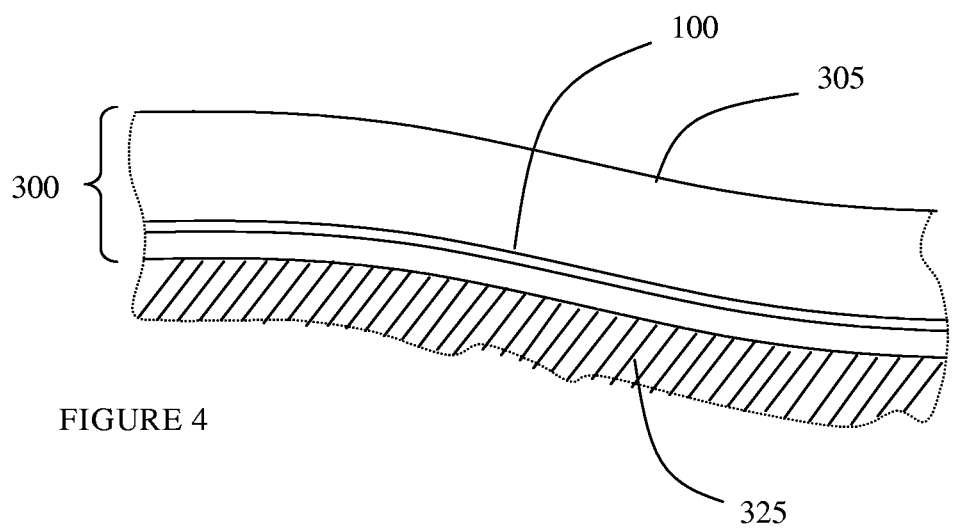
FIG. 4 shows a vertical longitudinal cross section through the slot of FIG. 3.

Referring to FIG. 4, it will often be the case that the route to be supported by a duct assembly installation is not consistently straight in either the vertical plane or the horizontal plane. FIG. 4 shows a relatively gentle change in direction in the vertical plane occasioned for example by a slope in the road surface 305. Relatively sharp changes in direction can be accommodated using access chambers as further described below. However, gentler changes in direction in either the vertical plane or the horizontal plane can be accommodated by a curved section of the slot 300 and the degree of flexibility offered by the duct assemblies 100, 200.

An advantage of the water barrier 130 being metal material used in the duct assemblies 100, 200 on the inner surface of the first sheath 110 is its ability to give the duct assemblies 100, 200 shape memory. When a duct assembly 100, 200 is installed onto sand at the bottom of a slot 300, it can be pushed down mechanically. Once it has been pushed down along a change in direction such as shown in FIG. 4, or indeed in a horizontal plane, it can retain the resultant shape and thus is easier to install.

Changes in direction must of course take into account the minimum bend radius of the duct assembly 100, 200, either regarding permanent deformation of the duct walls as mentioned above or the minimum bend radius to which optical fibres can be subjected when installed in the duct assembly 100, 200. This may vary from duct to duct 105, 205 and from fibre to fibre but the minimum bend radii described above for duct assemblies according to embodiments of the invention are well above standard for most if not all communications fibres.

Figure 5:
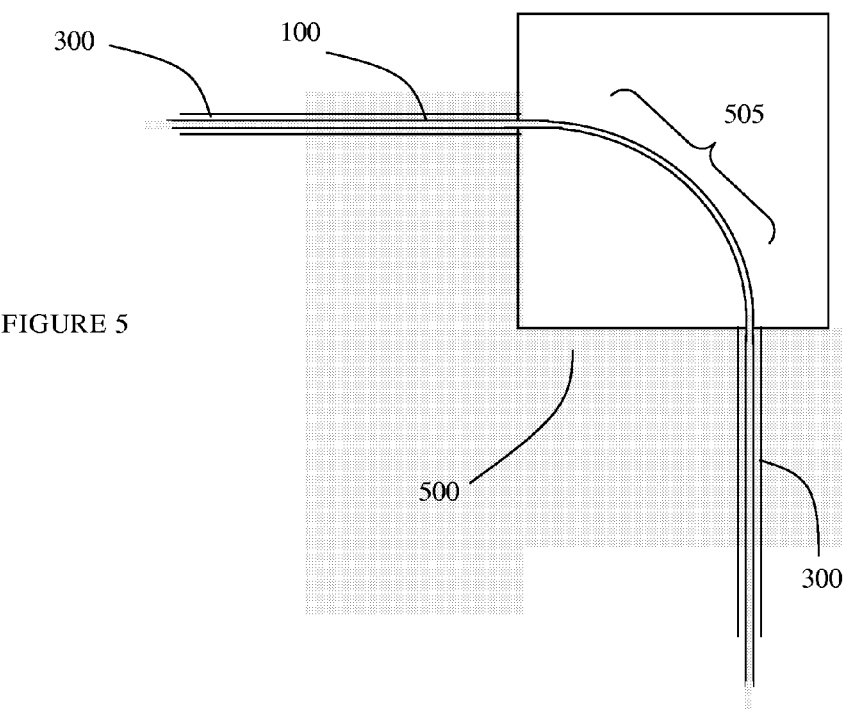
FIG. 5 shows a schematic plan view of an access chamber for accommodating a bend in an installed duct assembly.
Figure 6:
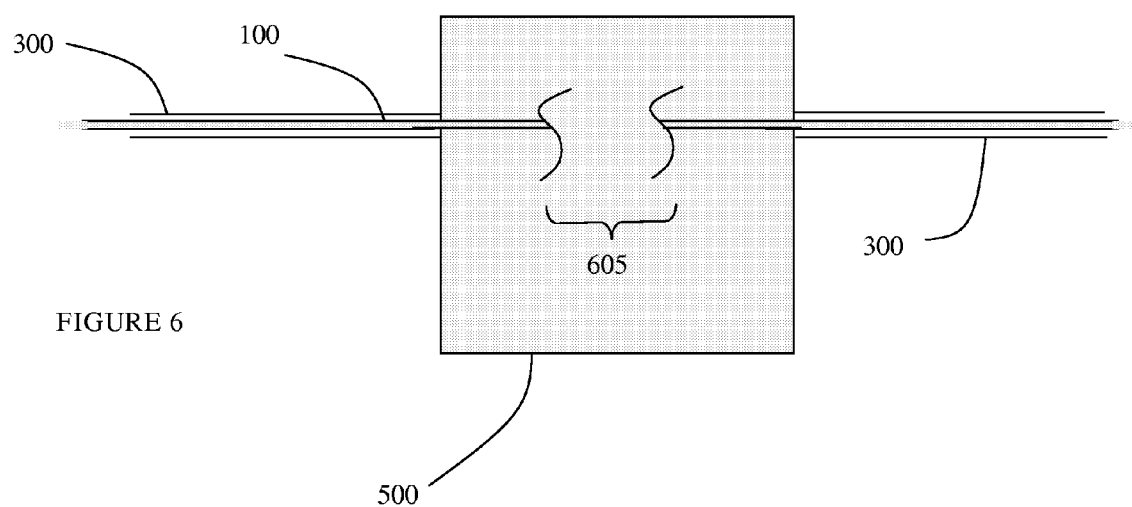
FIG. 6 shows a schematic plan view of an access chamber for making a repair in an installed duct assembly.

Referring to FIGS. 5 and 6, an access chamber 500 has several uses in embodiments of the present invention. It provides flexibility and accessibility at intervals along the route of a slot 300. Chambers 500 can be installed at strategic positions along the route and can be used for turning corners in the route as well as for splicing fibres or blowing them into duct assemblies 100, 200. Chambers can also be used for accommodating branches in a network supported by the duct assembly 100, 200, either at the time of installation of the duct assembly 100, 200 or at a later date, and/or connection from a network supported by the duct assembly 100, 200 to another network such as an in-building network.

Access chambers of this type are known for example for use in jointing cables in the field and only limited constructional detail is therefore given herein. A chamber is made in sections which can be stacked one above the other. Entry and exit points are provided at the junction between one section and the next. To install a chamber, a hole is dug, a bottom section of the chamber is installed and a duct assembly is laid into notches in the upper edge of the bottom section. The next section of the access chamber is then laid on top, having notches in its lower edge which can be brought into registration with the notches in the upper edge of the bottom section. The notches together provide entry and exit points in the finished chamber. Intervening annular sections can be added which allow different configurations of entry and exit points. Once the chamber is installed, material is backfilled against the chamber walls.

Optical fibre in embodiments of the present invention can be blown into a duct over a distance of for example about seven hundred meters, thus access chambers 500 will usually be installed at least at this maximum interval along a slot to provide fibre blowing points. However, it will be appreciated that these distances may change as the techniques and materials change.

In practice, fibre can be blown into a duct assembly so that it is continuous over distances considerably greater than 700 m. For example, 1400 m of fibre can be blown in from one fibre blowing point in two operations, one in each direction along a slot away from the blowing point. Further, a greater length of fibre (say 2100 m) can be blown in without a fibre joint by blowing the whole length in at one fibre blowing point to the next, then recoiling the remaining fibre and blowing it again, to the next consecutive blowing point and so on.

Referring to FIG. 5, in a novel construction, an access chamber 500 may additionally be installed to accommodate a bend 505 in a duct assembly 100 between two sections of slot 300 set at angles to one another. This construction is relatively easy to install since the duct assembly 100 itself has a minimum bend radius as described above.

Referring to FIG. 6, relatively close spacing of access chambers 500 along a slot also facilitates repairs. In the event of damage to a duct assembly, firstly the site of the damage 605 may be visible, for example if a road is up for repair. If not, the distance to a damage site 605 can be measured using the known technique of optical time domain reflectometry ("OTDR") along one or more of the optical fibres contained in the duct assembly 100. Once the site 605 is known, an access chamber 500 can be installed there. Repair to the duct at the site 605 is carried out and new optical fibres can be blown through from the next fibre blowing point in an access box 500 along the slot 300.

Alternatively, where preferred, rather than installing an access chamber at the damage site, the duct can simply be repaired there, the slot and surface effectively reinstated and again the whole section of fibre passing through the repaired section may be replaced from an existing fibre blowing point along the slot. That is, a hole is made so far as necessary at the site of a damaged piece of duct assembly, the damage is repaired to create a repaired section of duct assembly and the repaired section is directly re-buried by backfilling and compaction as necessary to reinstate the surface. This effectively continues the slot in which the duct assembly was originally installed.

Figure 7:
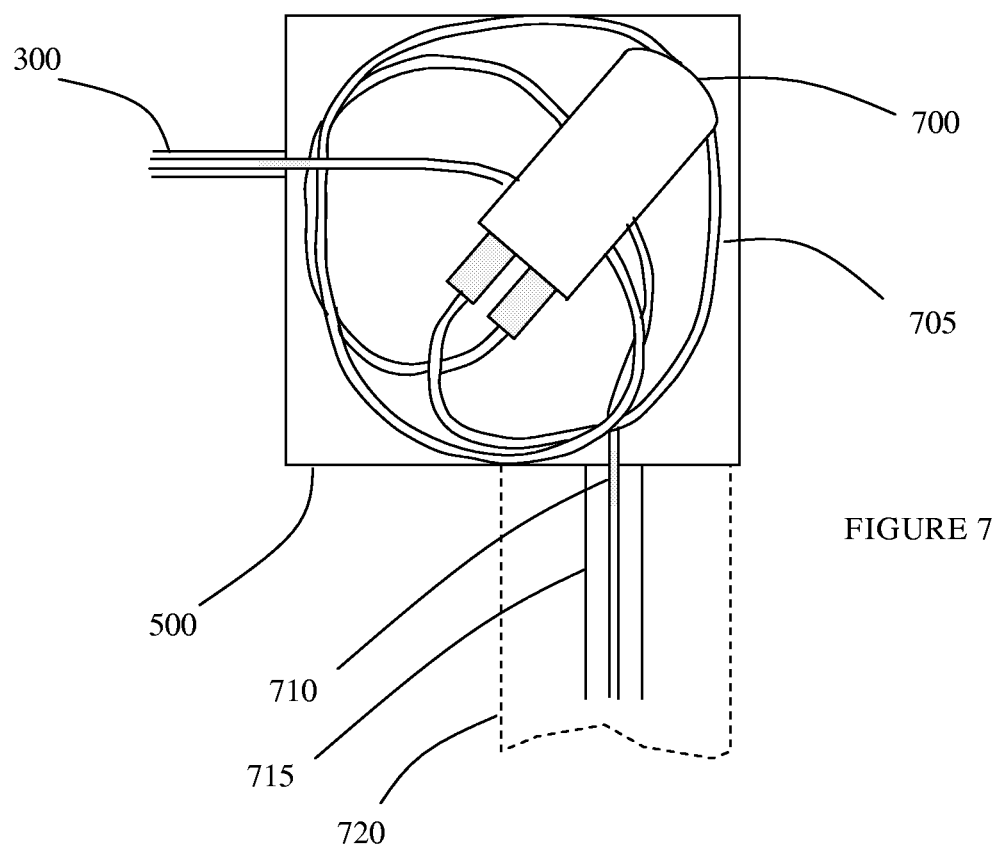
FIG. 7 shows a schematic plan view of an access chamber for accommodating a joint in an installed duct assembly.

Referring to FIG. 7, in a further use of an access chamber 500, one can be used to accommodate a splice enclosure 700 for jointing fibres carried by a duct assembly 100. This might be for instance to provide a branch in a network supported by the duct assembly 100, to provide a connection to an existing network, or to accommodate a change to another construction technique more appropriate to another section of the route. For example, an existing network might have been installed using an optical cable 710 buried in a housing 715 in a trench 720 and the splice enclosure 700 houses a connection between fibres of the duct assembly 100 and the optical cable 710. It will be usual to leave a slight excess length 705 of duct assembly in the access chamber 500 when using a splice enclosure 700 to allow for later connections and reconnections to be made. (Splice enclosures 700 themselves are known and not therefore further described herein.)

In the above, duct assemblies are described which comprise two or more ducts to accommodate optical fibres and/or fibre bundles. Embodiments of the present invention can also be applicable where there is only one duct and this may be of circular cross section, generally giving a duct assembly which also has a circular cross section.

The invention claimed is:

1. A method of burying an optical communications duct assembly below a surface, a cross section of the duct assembly having two outer dimensions in orthogonal directions, at least one of said two dimensions being no more than 20 mm, which method comprises the steps of:
  cutting a slot extending through a surface of a bound layer of material, the slot having a width in a range from more than 12 mm up to and including 30 mm, said slot width being greater than a smaller one of said two dimensions and being less than a larger one of said two dimensions, wherein the surface is a bearing surface and a depth of the slot is greater than a thickness of the bound layer of material and a bottom of the slot being provided entirely in an unbound material;
  laying the duct assembly in the slot into the unbound material such that the duct assembly is supported by a bottom of the slot;
  backfilling the slot; and
  installing at least one optical fibre in said duct assembly after the step of backfilling the slot;
  wherein the step of laying the duct assembly in the slot comprises laying the duct assembly into or onto a supporting material at the bottom of the slot, the duct assembly being thus supported at least partially via the supporting material.

2. A method according to claim 1, wherein the slot has a width in the range from 13 mm to 20 mm.

3. A method according to claim 1, wherein the width of the slot is at least 4 mm greater than a smaller one of said two dimensions.

4. A method according to claim 1, wherein the slot has a depth below the surface in the range from 150 mm to 400 mm.

5. A method according to claim 1, wherein the duct assembly is airtight at ambient pressures.

6. A method according to claim 1, wherein the supporting material comprises a granular material.

7. A method according to claim 1, further comprising:
  forming a binder layer around the duct assembly with the supporting material, wherein said binder layer protrudes into said unbound material, and
  wherein the supporting material is selected from one or more of: sand, Grano dust, foams, polymeric and plastics materials, and an elasticated foam rod.

8. A method according to claim 1, further comprising:
  positioning the duct assembly fully beneath an underside of said bound layer of material.

9. A method according to claim 1, wherein the duct assembly has a brightly coloured sheath.

10. A buried optical communications duct assembly having two outer dimensions in orthogonal directions, at least one of the two outer dimensions being no more than 20 mm, said buried optical communications duct assembly comprises:
  a slot that is cut into and extending through a surface of a bound layer of material, the slot having a width ranging from more than 12 mm up to and including 30 mm, said slot width being significantly greater than a smaller one of said two dimensions and being less than a larger one of said two dimensions, wherein the surface is a bearing surface and a depth of the slot is greater than a thickness of the bound layer of material and a bottom of the slot being provided entirely in an unbound material;
  a duct assembly laid in the slot into the unbound material such that the duct assembly is supported by a bottom of the slot, wherein the duct assembly has at least one duct for the installation of optical fibres subsequent to burial of the assembly below the surface; and
  a backfilling of the slot;
  wherein the duct assembly is laid in the slot into or onto a supporting material at the bottom of the slot, the duct assembly being thus supported at least partially via the supporting material.

11. A buried optical communications duct assembly according to claim 10, further comprising two or more ducts for carrying optical fibres.

12. A buried optical communications duct assembly according to claim 10, further comprising at least three ducts for carrying optical fibres.

13. A buried optical communications duct assembly according to claim 12, wherein a cross section of the duct assembly is elongate.

14. A buried optical communications duct assembly according to claim 13, wherein the cross section of the duct assembly has two dimensions in mutually orthogonal directions, neither one of the two dimensions measuring more than 20 mm.

15. A buried optical communications duct assembly according to claim 13, wherein the at least three ducts are arranged linearly in the plane of the cross section, one duct being positioned between at least two other ducts.

16. A buried optical communications duct assembly according to claim 13, wherein the at least three ducts are arranged in a triangular formation in the plane of the cross section.

17. A buried optical communications duct assembly according to claim 11, comprising more than one duct wherein at least two ducts do not have the same diameter.

18. A buried optical communications duct assembly according to claim 17, comprising at least three ducts, wherein a larger duct is arranged with two smaller ducts in a triangular formation in the plane of the cross section.

19. A buried optical communications duct assembly according to claim 10, further comprising at least one access chamber to give access to a buried length of duct assembly.

20. A buried optical communications duct assembly according to claim 19, wherein a section of the duct assembly extends across the access chamber in a curved formation to accommodate a change in direction between a first section of the slot and a second section of the slot.

21. A buried optical communications duct assembly according to claim 20, wherein the duct assembly is continuous between said first and second sections.

22. A buried optical communications duct assembly according to claim 10, wherein the duct assembly comprises a repaired section of the duct, said repaired section being directly buried so as to continue the slot.

23. A buried optical communications duct assembly according to claim 10, further comprising a duct having a wall whose performance in a transverse direction across the duct is less than pressurised watertight.

24. A buried optical communications duct assembly according to claim 10, wherein said duct assembly is positioned completely beneath an underside of said bound layer of material.

25. A method of repairing a buried optical communications duct assembly, a cross section of the duct assembly having two outer dimensions in orthogonal directions, at least one of said dimensions being no more than 20 mm, said optical communications duct assembly being buried in a method comprising the steps of:
   cutting a slot into and extending through a surface of a bound layer of material, the slot having a width ranging from more than 12 mm up to and including 30 mm, said slot width being significantly greater than a smaller one of said two dimensions and being less than a larger one of said two dimensions, wherein the surface is a bearing surface and a depth of the slot is greater than a thickness of the bound layer of material, and a bottom of the slot being provided entirely in an unbound material;
   laying the duct assembly in the slot into the unbound material such that the duct assembly is supported by a bottom of the slot;
   backfilling the slot; and
   installing at least one optical fibre in said duct assembly after the step of backfilling the slot;
   wherein the method of repairing the buried optical communications duct assembly comprises:
      installing at least one access chamber at a damaged section of the duct assembly;
      removing said damaged section; and
      installing at least one optical fibre in said duct assembly from the access chamber;
   wherein the step of laying the duct assembly in the slot comprises laying the duct assembly into or onto a supporting material at the bottom of the slot, the duct assembly being thus supported at least partially via the supporting material.

26. A method of repairing a buried optical communications duct assembly according to claim 25, further comprising installing said at least one optical fibre in said duct assembly from a fibre blowing point positioned along the slot.

27. A method of repairing a buried optical communications duct assembly according to claim 25, further comprising:
   cutting a hole into the surface at a site of damage to the duct assembly;
   repairing the duct assembly; and
   backfilling the hole so as to rebury the repaired duct assembly and continue the slot.

28. A method of repairing a buried optical communications duct assembly according to claim 25, further comprising:
   positioning the duct assembly fully beneath an underside of said bound layer of material.

* * * * *